(12) United States Patent
Sisk et al.

(10) Patent No.: US 8,226,573 B2
(45) Date of Patent: Jul. 24, 2012

(54) THERMOMETER PROBE

(75) Inventors: Ricky A. Sisk, Washington, MO (US); Joseph T. Gierer, Glen Carbon, IL (US)

(73) Assignee: Tyco Healthcare Group LP, Mansfield, MA (US)

( * ) Notice: Subject to any disclaimer, the term of this patent is extended or adjusted under 35 U.S.C. 154(b) by 50 days.

(21) Appl. No.: 12/619,181

(22) Filed: Nov. 16, 2009

(65) Prior Publication Data

US 2011/0118622 A1    May 19, 2011

(51) Int. Cl.
*A61B 5/00* (2006.01)
(52) U.S. Cl. .................................................. 600/549
(58) Field of Classification Search ............... 252/962; 374/208, 209; 600/549, 555; 607/21
See application file for complete search history.

(56) References Cited

U.S. PATENT DOCUMENTS

| | | | |
|---|---|---|---|
| 4,061,226 A | 12/1977 | Essen | |
| 4,665,927 A * | 5/1987 | Daily | 600/549 |
| 4,679,949 A | 7/1987 | Sakamoto | |
| 4,741,627 A | 5/1988 | Fukui et al. | |
| 5,281,214 A | 1/1994 | Wilkins et al. | |
| 5,361,757 A | 11/1994 | Smith et al. | |
| 5,991,652 A | 11/1999 | Barthelemy et al. | |
| 6,039,177 A | 3/2000 | Swanson et al. | |
| 6,044,880 A | 4/2000 | Maeng | |
| 6,469,254 B1 * | 10/2002 | Lee et al. | 174/138 G |
| 7,197,356 B2 * | 3/2007 | Carr | 600/430 |
| 7,316,507 B2 | 1/2008 | Sisk et al. | |
| 7,455,451 B2 | 11/2008 | Pearl et al. | |
| 7,703,977 B2 * | 4/2010 | Knishevitskiy | 374/208 |
| 2004/0101029 A1 * | 5/2004 | Brunvoll | 374/163 |
| 2005/0228307 A1 * | 10/2005 | Gibree | 600/549 |
| 2007/0100253 A1 * | 5/2007 | Sisk et al. | 600/549 |
| 2008/0123717 A1 * | 5/2008 | Lane et al. | 374/209 |
| 2008/0232429 A1 | 9/2008 | Knishevitskiy | |
| 2009/0171238 A1 * | 7/2009 | Hanley et al. | 600/549 |

* cited by examiner

*Primary Examiner* — Jeffrey G Hoekstra
*Assistant Examiner* — Charles Becker
(74) *Attorney, Agent, or Firm* — Lisa E. Winsor, Esq.

(57) ABSTRACT

A probe for an electronic thermometer includes a first elongate, semi-cylindrical probe shaft member having a distal end, a proximal end, first and second edges extending between the proximal and distal ends, an interior surface and an exterior surface. A second elongate, semi-cylindrical probe shaft member has a distal end, a proximal end, first and second edges extending between the proximal and distal ends, an interior surface and an exterior surface. A joint along which the second probe shaft member is attached to the first probe shaft member forms an interior space between the probe shaft members. A probe tip is disposed on the distal ends of the first and second probe shaft members. A temperature sensor is in thermal communication with the probe tip.

21 Claims, 15 Drawing Sheets

THERMOMETER PROBE

FIELD OF THE INVENTION

The present invention generally relates to electric thermometer probes, and more particularly, to an electric thermometer probe having a clam shell design and components molded in the probe.

BACKGROUND OF THE INVENTION

Electronic thermometers are widely used in the healthcare field for measuring a patient's body temperature. Typical electronic thermometers include a probe comprising an elongate shaft. Electronic temperature sensors such as thermistors or other temperature sensitive elements are contained within the shaft portion. In one version, the probe includes a cup-shaped aluminum tip at its distal end. A thermistor is placed in thermal contact with the aluminum tip inside the probe. When a free end portion is placed, for example, in a patient's mouth, the tip is heated up by the patient's body and the thermistor measures the temperature of the tip. Additional electronics connected to the electronic sensor components may be contained within a base unit connected by wire to the shaft portion or may be contained within a handle of the shaft portion, for example. Electronic components receive input from the sensor components to compute the patient's temperature. The temperature is then typically displayed on a visual output device such as a seven segment numerical display device.

Current probe designs comprise hollow plastic cylindrical shafts that have been extruded and then secondary machined. As discussed above, the probe shaft may house circuitry for detecting temperature. Because of the unitary nature of the probe shaft, the circuitry must be pulled through the shaft which can damage the circuit. Also, any additional components must be machined into or bonded to the shaft. Therefore, there exists a need for an improved electronic thermometer probe shaft design that more easily accommodates thermometer components and accessories.

SUMMARY OF THE INVENTION

In one aspect of the present invention, a probe for an electronic thermometer generally comprises a first elongate, semi-cylindrical probe shaft member having a distal end, a proximal end, first and second edges extending between the proximal and distal ends, an interior surface and an exterior surface. A second elongate, semi-cylindrical probe shaft member has a distal end, a proximal end, first and second edges extending between the proximal and distal ends, an interior surface and an exterior surface. A joint along which the second probe shaft member is attached to the first probe shaft member forms an interior space between the probe shaft members. A probe tip is disposed on the distal ends of the first and second probe shaft members. A temperature sensor is in thermal communication with the probe tip.

In another aspect, a probe for an electronic thermometer generally comprises a generally tubular shaft having a proximal end, a distal end, an inner surface and an outer surface. A probe tip is disposed on the distal end of the shaft and is adapted to be heated to a temperature by an object for use in measuring the temperature of the object. A temperature sensor is in thermal contact with the probe tip. At least one component is molded on the outer surface of the shaft. The shaft and the at least one component are molded together as one piece of material.

In yet another aspect, a method of making a probe for an electronic thermometer generally comprises forming a first probe shaft member via a first mold. Forming a second probe shaft member via one of the first mold and a second mold. Mounting a temperature sensor and probe tip on a distal end of a circuit. Placing the circuit in one of the first and second probe shaft members. Mating the first probe shaft member with the second probe shaft member, enclosing the circuit between the probe shaft members.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
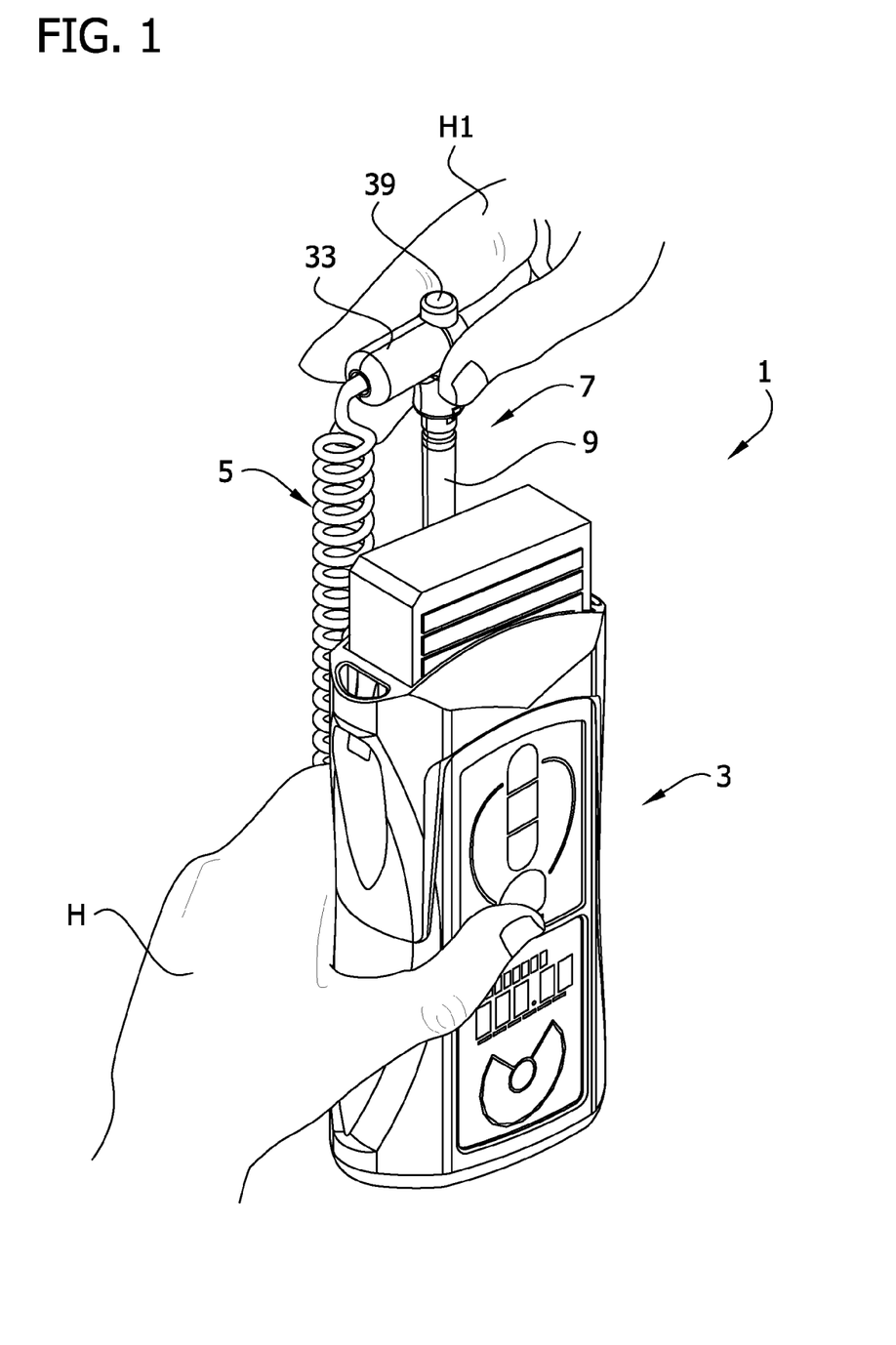
FIG. 1 is a perspective of an electronic thermometer.
Figure 2:
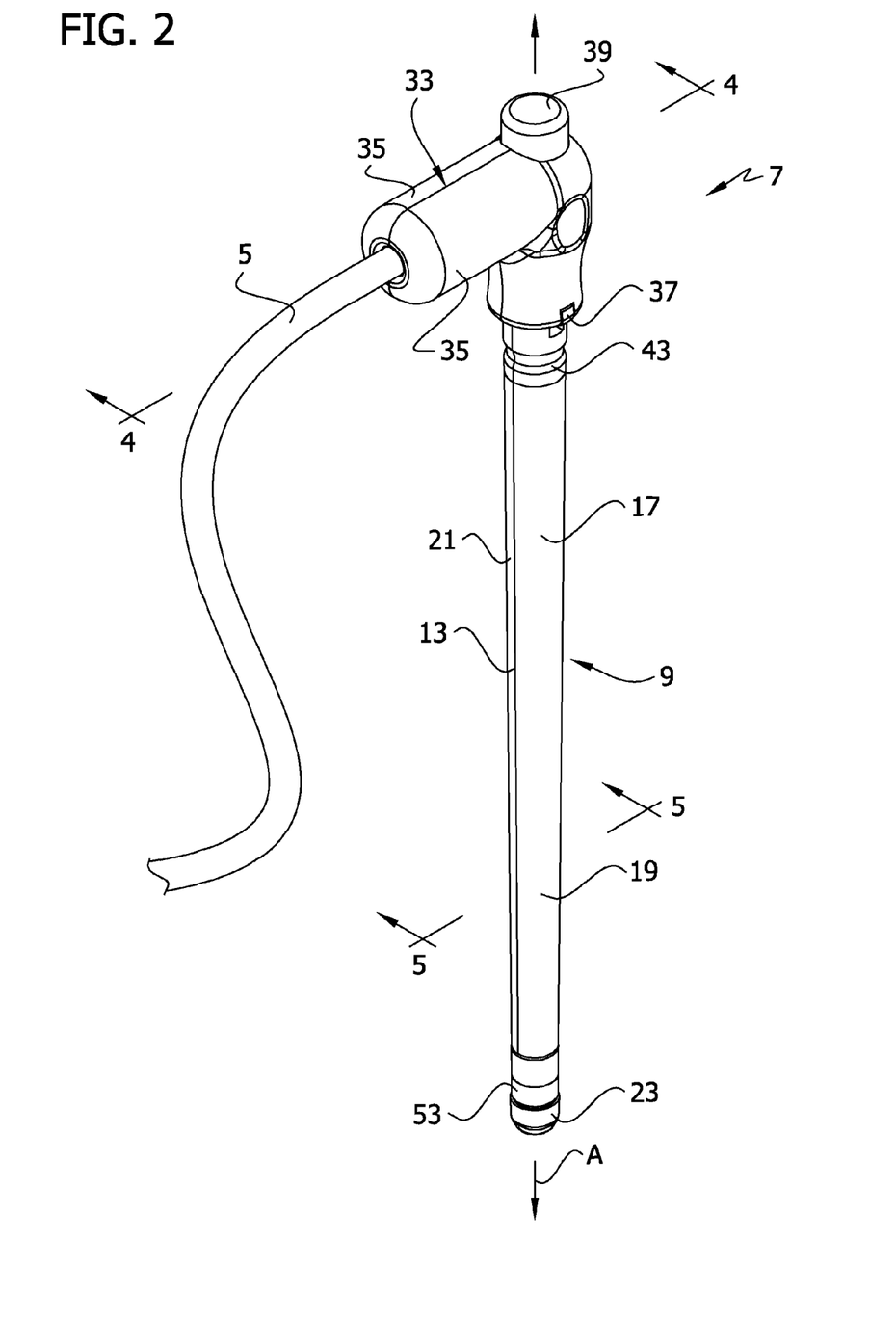
FIG. 2 is a perspective of a probe of the electronic thermometer.

Referring now to the drawings and in particular to FIGS. 1 and 2, an electronic thermometer is indicated generally at 1. The electronic thermometer comprises a temperature calculating unit, indicated generally at 3 that is sized to be held comfortably in the hand H. The calculating unit 3 is connected by a helical cord 5 to a probe of the present invention, indicated generally at 7. The probe 7 is constructed for contacting an object (e.g., a patient) and sending signals to the calculating unit 3 representative of the temperature. The calculating unit 3 receives the signal from the probe 7 and uses them to calculate temperature. Suitable circuitry for performing these calculations is contained within the calculating unit 3. The components within the calculating unit of an electronic thermometer are well known to those skilled in the art.

Figure 3:
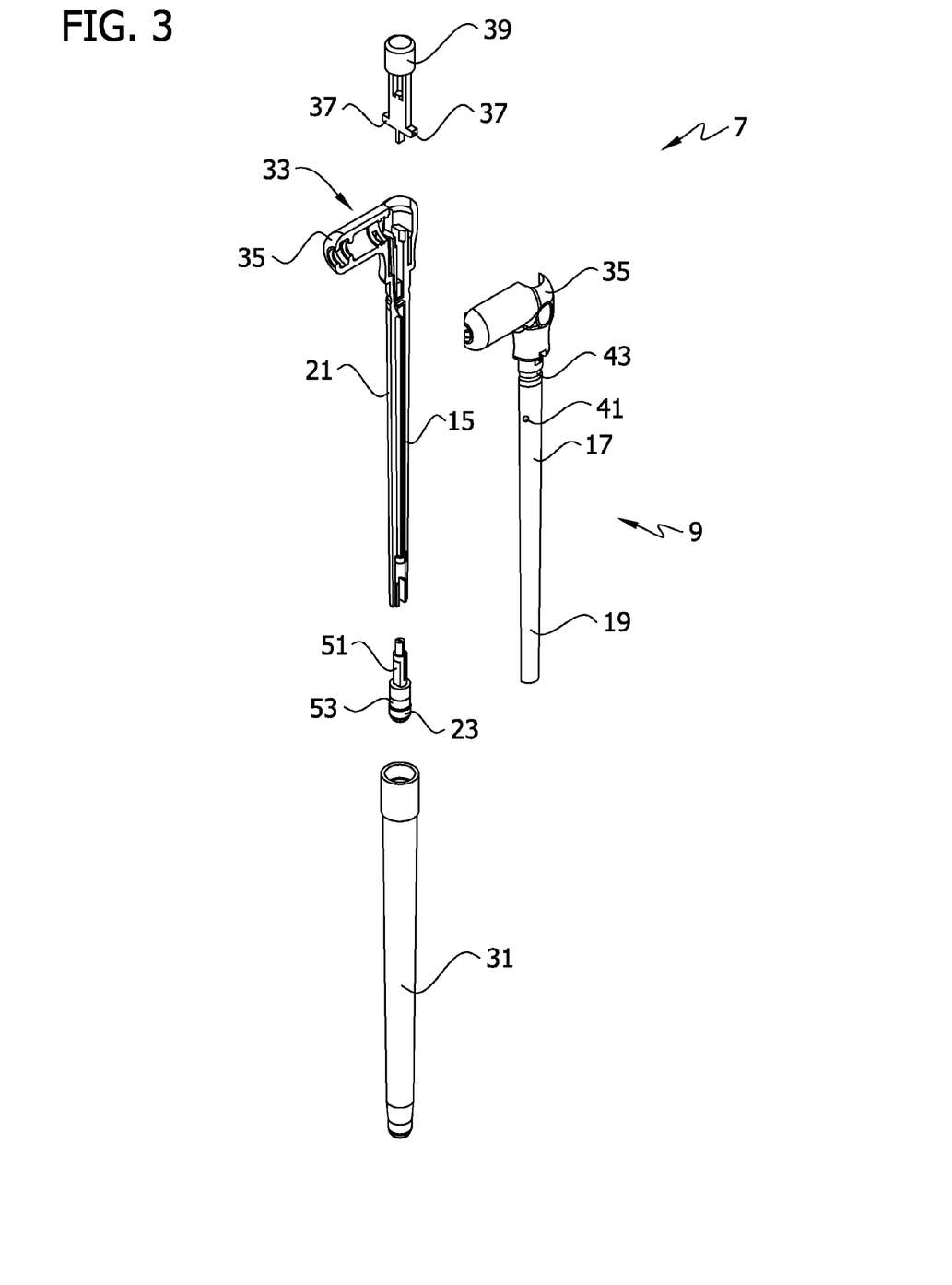
FIG. 3 is an exploded view of the probe including a probe cover.
Figure 6:
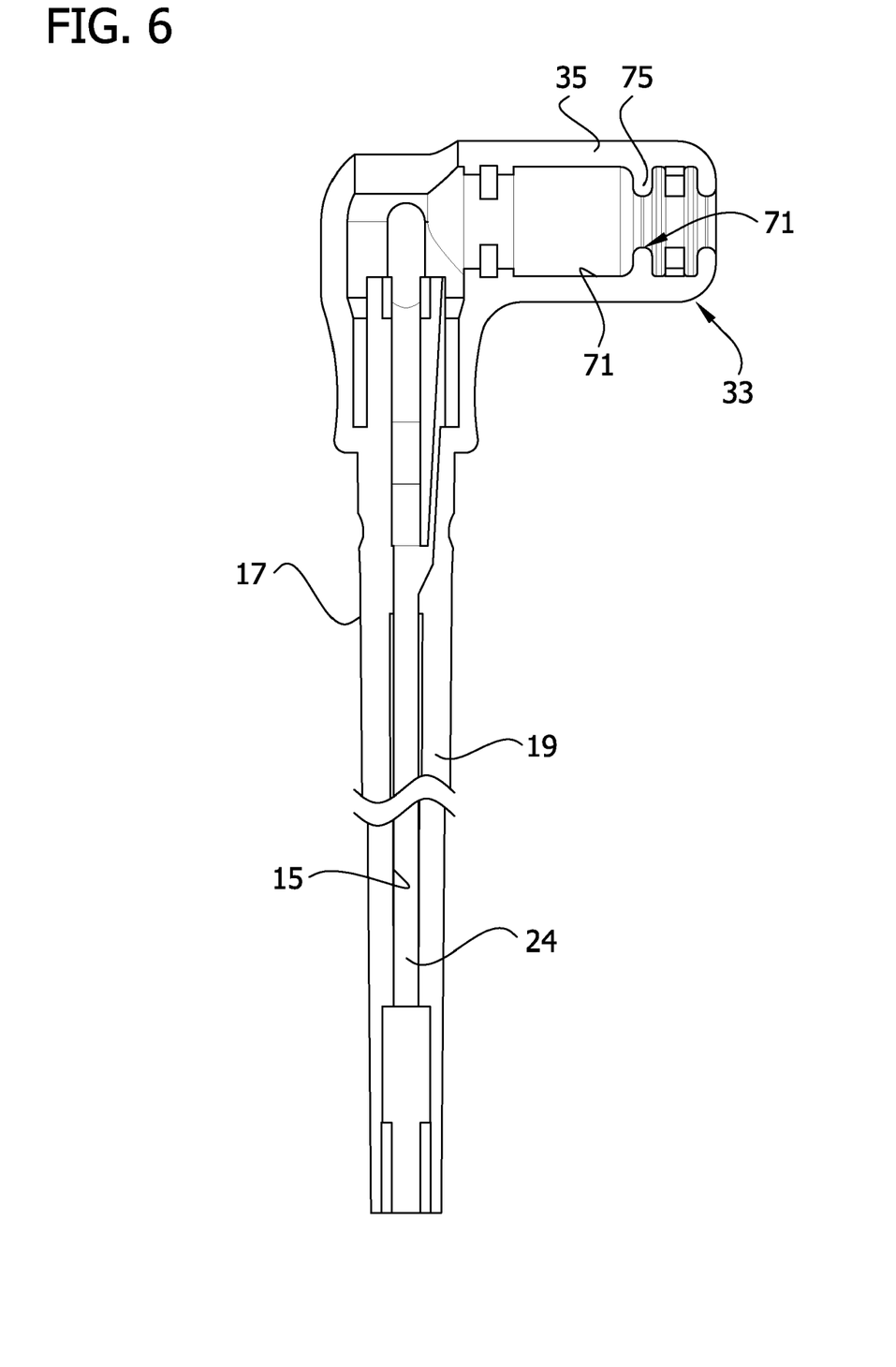
FIG. 6 is a fragmentary elevation of a probe shaft member of the probe.

Referring to FIGS. 2 and 3, the probe 7 comprises a generally tubular shaft 9 having a proximal end nearest to the connection of the cord 5, a distal end, an inner surface 15 and an outer surface 17. The shaft 9 is formed by first and second semi-cylindrical probe shaft members 19, 21 joined together along their longitudinal axis via a weld or bond line 13. Elongate protrusions 22 (FIG. 4) on the inner surface 15 of the second probe shaft member 21 are configured to mate with an elongate groove 24 (FIG. 6) in the inner surface 15 of the first probe shaft member 19 to align the probe shaft members together for securement via the weld or bond line. A probe tip 23 is disposed on the distal end of the probe shaft 9 and is adapted to be heated to a temperature by the patient. In the preferred embodiment, the probe 7 is made of plastic and the tip 23 is made of aluminum. However, other materials can be used without departing from the scope of the invention.

The distal end of the probe 7 is configured to be inserted into a probe cover 31. The probe cover is preferably made of highly thermally conductive material over at least the portion covering the tip 23, so that the tip can be rapidly heated by the patient. A handle 33 extends from the proximal end of the probe shaft 9, radially outward from a longitudinal axis A of the shaft. The handle 33 is sized to be held by a hand H1 (FIG. 1). The handle 33 comprises a pair of handle members 35, each of which extends from the probe shaft members 19, 21, respectively. Pushers 37 are located at the junction between the handle 33 and the probe shaft 9. The probe shaft is protected from contamination by the cover 31 when the distal end 13 of the probe shaft 9 is inserted, for example, into a patient's mouth. A button 39 on the handle 33 can be depressed to cause the pushers 37 to move and engage an end of the probe cover 31 for releasing the probe cover from the probe shaft 9. Subsequent to use, the probe cover 31 can be discarded. Other ways of capturing and releasing a probe cover may be used without departing from the scope of the present invention.

Figure 4:
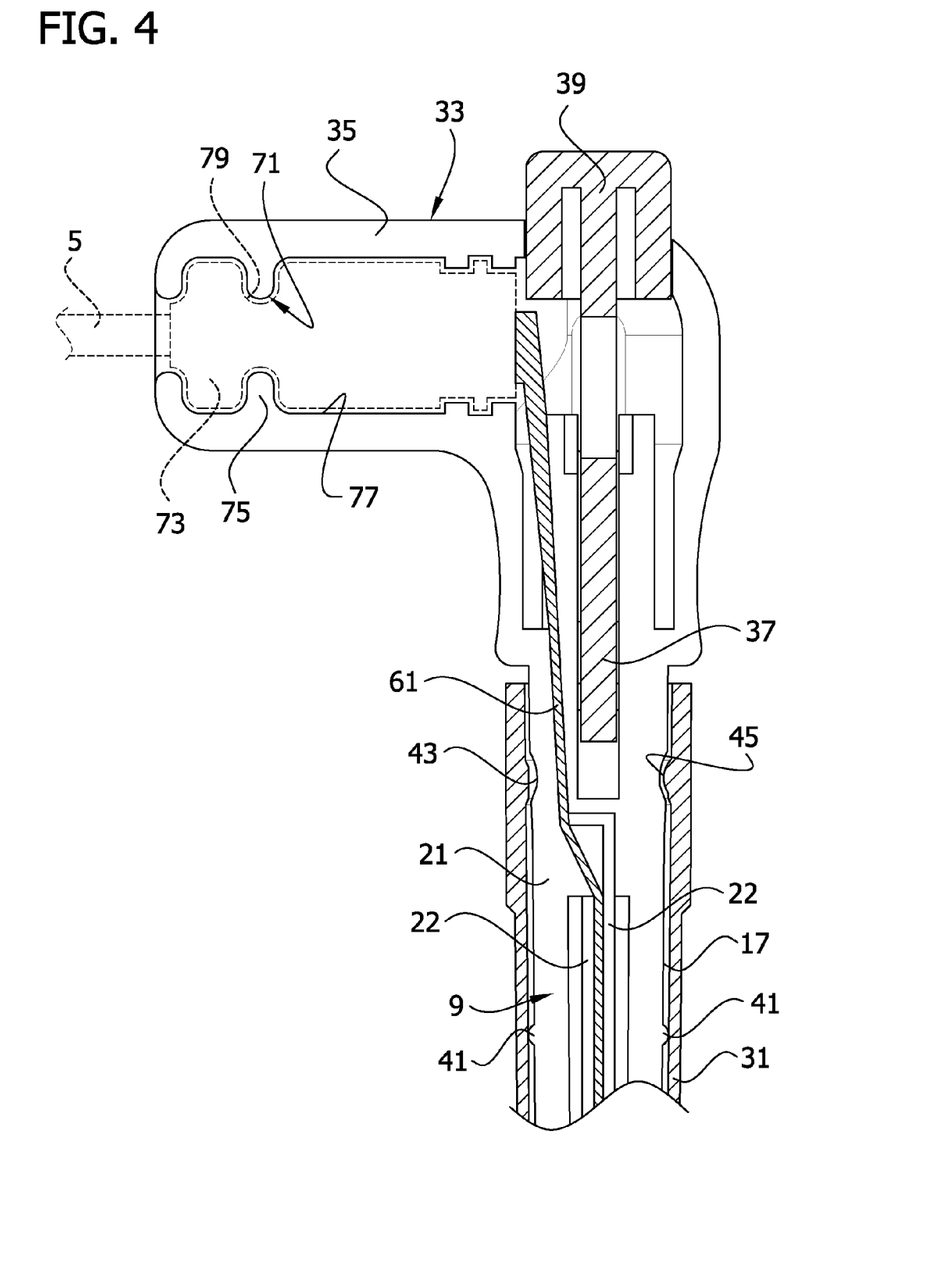
FIG. 4 is an enlarged, fragmentary section of a proximal end of the probe taken through line 4-4 of FIG. 2 received in the probe cover.
Figure 7:
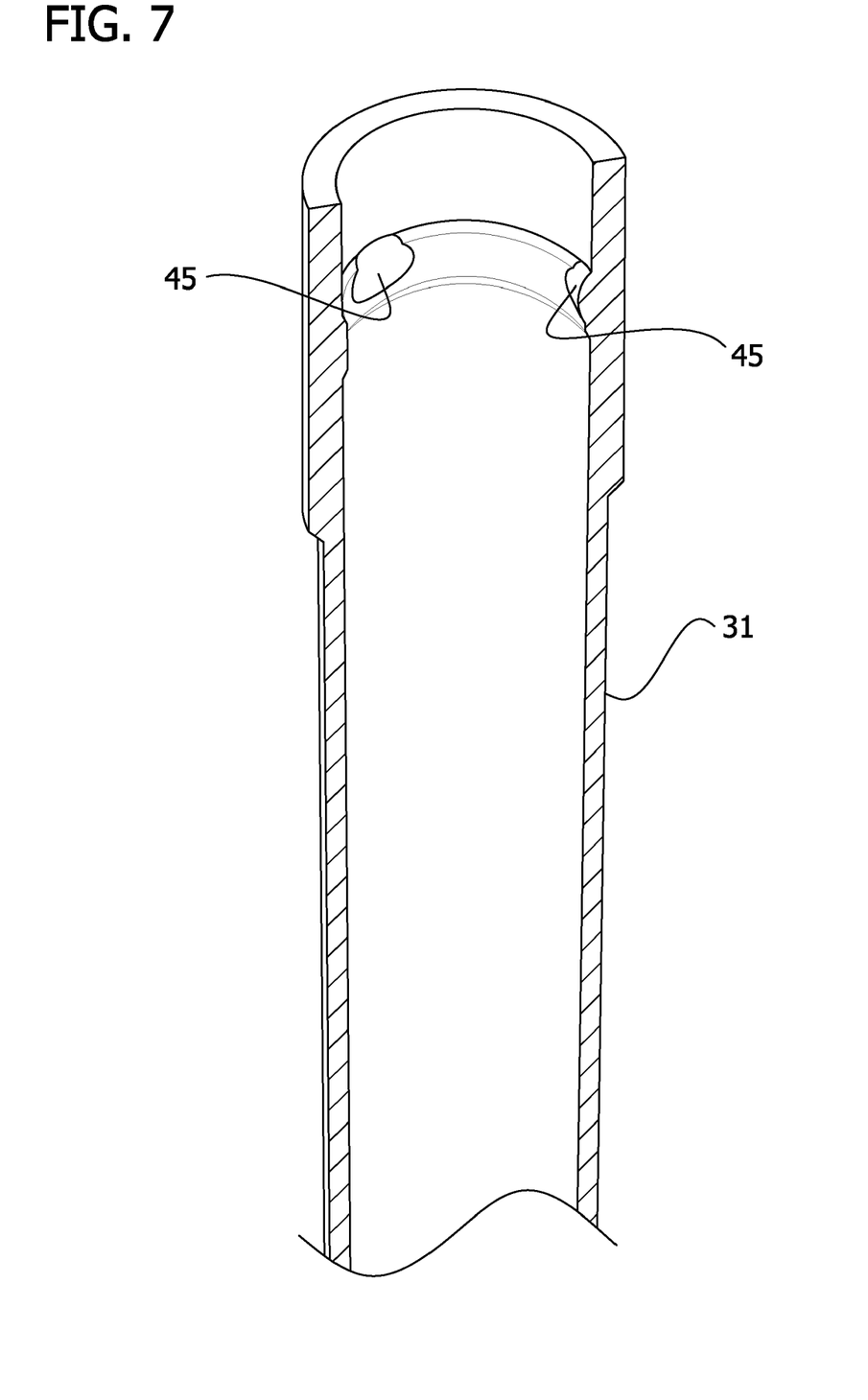
FIG. 7 is an enlarged, fragmentary section in perspective of a portion of the probe cover.

Referring to FIGS. 3 and 4, the outer surface 17 of the probe shaft 9 has at least one component molded thereon. The component and the probe shaft 9 are molded together as a one piece of material. The component may be in the form of an anti-rotational element for use when the probe 7 is received in the probe cover 31. Specifically, the anti-rotational element may comprise one or more ribs 41 for engaging an inner surface of the probe cover 31 to block rotation of the probe cover with respect to the probe shaft 9. Alternatively, the ribs 41 can be disposed on an inner surface of the probe cover 31 and engage the outer surface 17 of the probe shaft 9 to block rotation of the probe cover with respect to the probe shaft. Still other components can be molded with the probe 7 to block relative rotation between the probe shaft 9 and the probe cover 31. The component may also comprise an annular recess 43 (broadly, a probe cover retention element). The recess 43 is disposed at the proximal end of the probe shaft 9 and is configured to engage tabs 45 (FIG. 7) on the probe cover 31 to retain the probe cover on the probe shaft. Alternatively, the recess 43 can be disposed on the inner surface of the probe cover 31 and the tabs 45 can be molded on the outer surface 17 of the probe shaft 9. Components other than the recess and tabs may be used to retain the probe cover on the probe shaft.

The present probe shaft design incorporates components into the original mold that allow the probe to be used with electric thermometer accessories (i.e., probe covers). Therefore, unlike in prior art designs, additional components do not have to be machined into or bonded to the shaft because they are already formed as part of the mold. This design lowers the overall number of parts of the probe and minimizes the need for any additional bonding.

Figure 5:
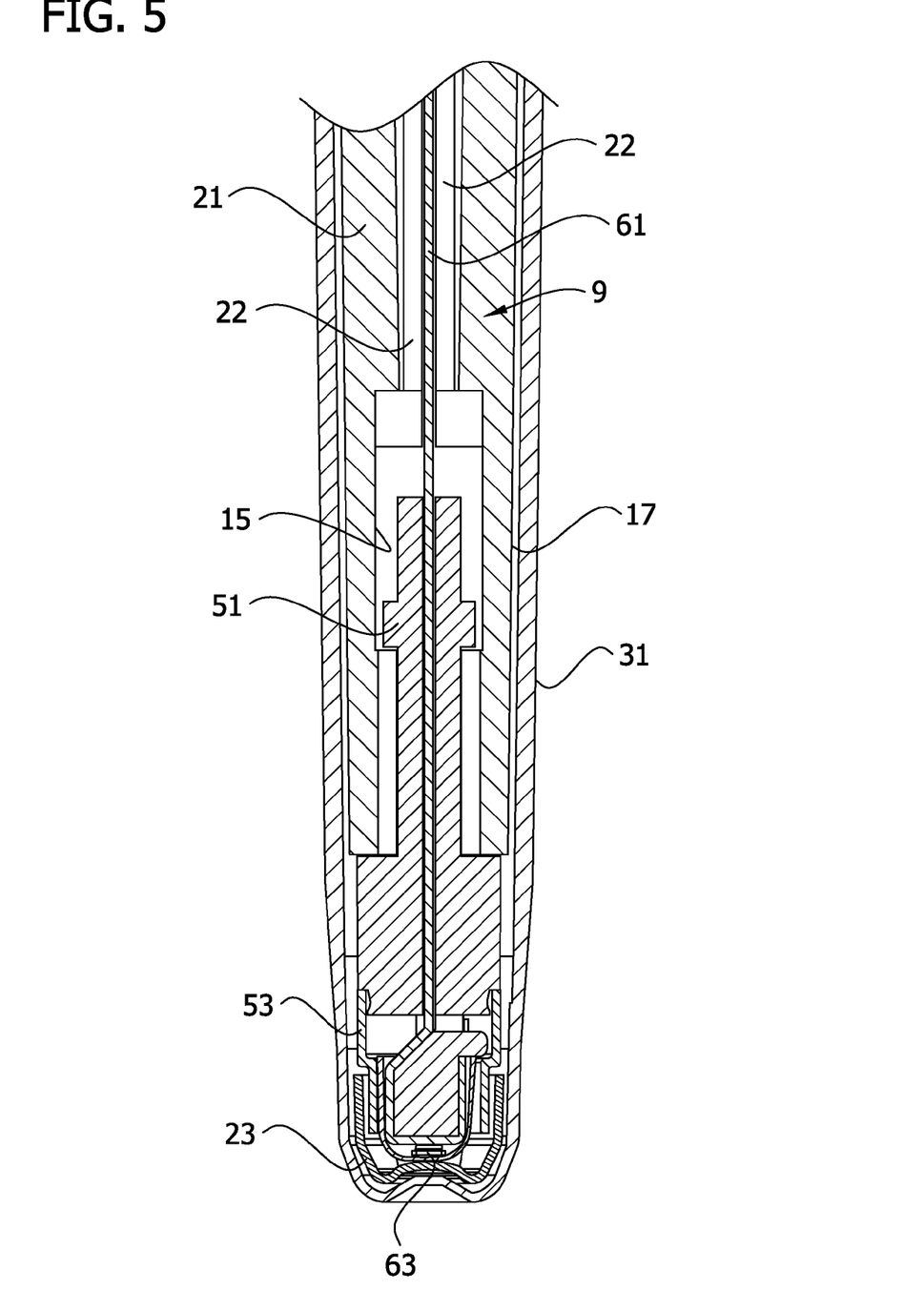
FIG. 5 is an enlarged, fragmentary section of a distal end of the probe taken through line 5-5 in FIG. 2 received in the probe cover.

Referring to FIGS. 3 and 5, a generally tubular separator, indicated at 51, is mounted on the inner surface 15 of at the distal end of the probe shaft 9 and extends generally into the open bottom of the tip 23, but does not engage the tip. An isolator, indicated generally at 53, is mounted on the end of the separator 51 and engages the tip 23 for use in mounting the tip on the probe shaft 9. The probe shaft, tip 23, separator 51 and isolator 53 may be connected together in a suitable fashion.

A flex circuit 61 (broadly, a circuit) disposed in the probe shaft 9 mounts a temperature sensor 63 adjacent the probe tip 23, placing the sensor in thermal communication with the tip. The flex circuit 61 is received in a channel formed by the elongate protrusions 22 on the inner surface 15 of the second probe shaft member 21. The sensor 63 generates a signal that is representative of the temperature of the tip 23. The signal is transmitted by one or more electrical conductors in the flex circuit 61 to the circuitry in the calculating unit 3. The function and operation of theses components are well known to those of ordinary skill in the art. Other arrangements and types of sensors and circuitry may be used within the scope of the present invention.

Referring to FIG. 4, the handle 33 includes a cord restraint feature 71 configured for engaging a strain relief element 73 attached to the cord 5 to retain the cord to the probe 7. The strain relief element 73 is electrically connected to the circuit 61 to provide an electrical connection between the circuit 61 and the circuitry in the calculating unit 3 via the cord 5. In the illustrated embodiment, the restraint feature 71 comprises an annular projection 75 on an inner surface 77 of the handle 33. The annular projection 75 is received in a corresponding annular groove 79 in the strain relief element 73 when the handle members 35 are attached around the strain relief element. The engagement between the projection 75 and groove 79 prevent the cord from being pulled out of the handle 33. Other configurations can be used to restrain the cord 5 in the probe 7 without departing from the scope of the present invention.

To make the probe 7, a first mold is used to form the first probe shaft member 19 and a second mold is used to form the second probe shaft member 21. Alternatively a single mold can be used to make both the first and second probe shaft members 19, 21. A distal end of the flex circuit 61 is inserted into and bent around the separator 51 (FIG. 5). The isolator 53 and probe tip 23 are mounted on a distal end of the separator 51. The portion of the flex circuit 61 extending out of the separator 51 is then placed in the channel formed in the second probe shaft member 21. The first probe shaft member 19 is then mated with the second probe shaft member 21 by aligning the projections 22 on the second probe shaft member with the groove 24 in the first probe shaft member, enclosing the flex circuit 61 between the probe shaft members. A weld or bond line 13 is then applied along edges of the probe shaft members 19, 21 to permanently attach the probe shaft members together.

Referring to FIGS. 8-10A, a probe 107 of a second embodiment is shown. The probe 107 comprises a first, elongate probe shaft member 119 having a distal end, a proximal end, first and second edges 125, 127 extending between the proximal and distal ends, an interior surface 115 and an exterior surface 117. A second elongate, probe shaft member 121 includes a distal end, a proximal end, first and second edges 125', 127' extending between the proximal and distal ends, an interior surface 115' and an exterior surface 117'. The first and second probe shaft members 119, 121 each have a channel shape. In cross section, the probe shaft members 119, 121 are generally U-shaped with laterally projecting portions that include the edges 125, 125', 127, 127'. The probe shaft members 119, 121 combine to form an enclosure and may be considered semi-cylindrical. The first and second probe shaft members 119, 121 are substantially identical. Therefore, their corresponding parts have been given the same number distinguished by a prime.

Figure 10:
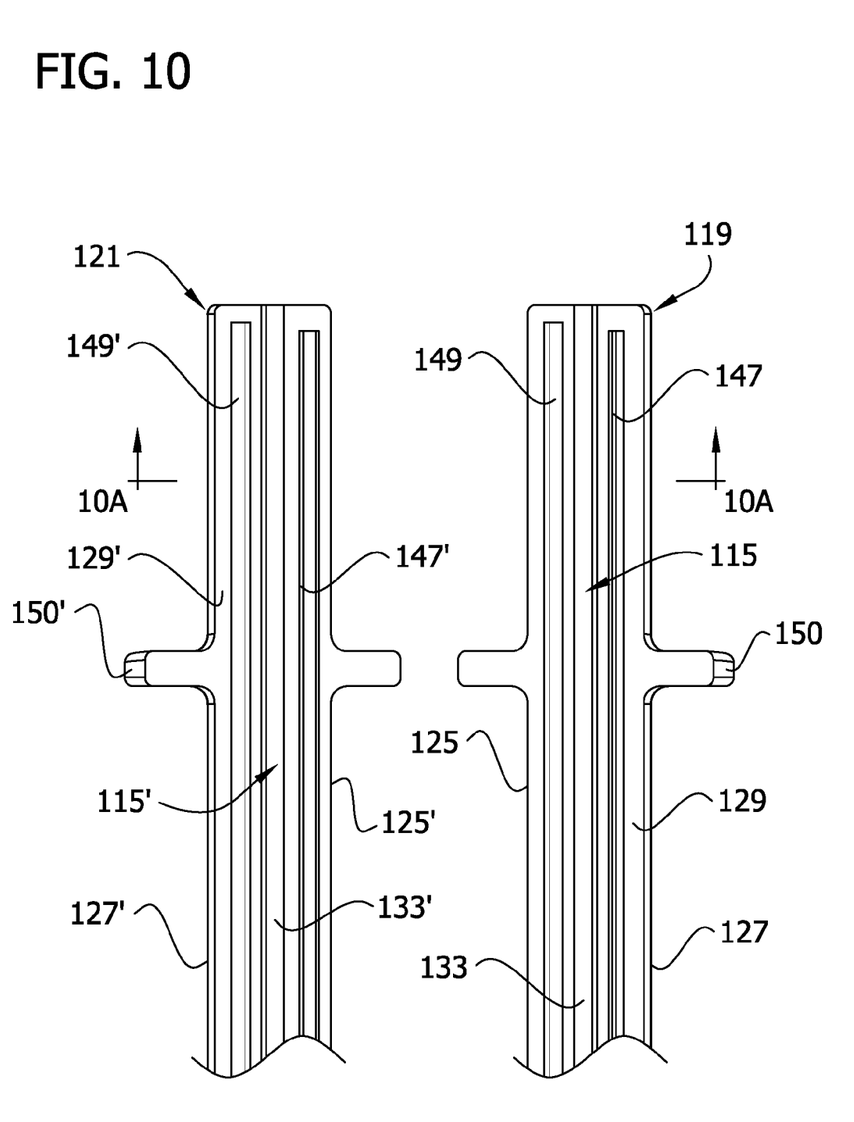
FIG. 10 is an enlarged, fragmentary perspective of proximal ends of first and second probe shaft members of the probe of the second embodiment.
Figure 10A:
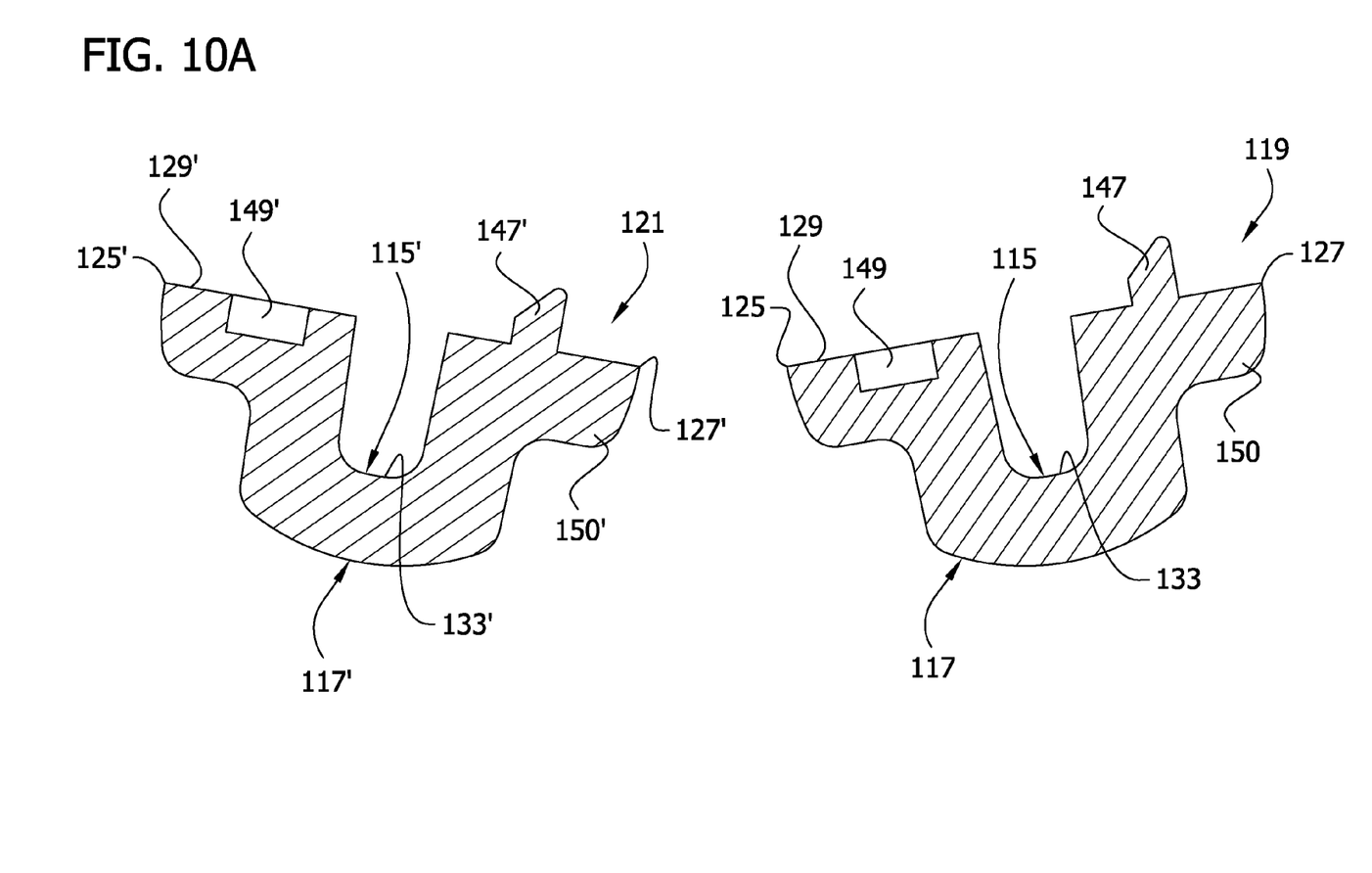
FIG. 10A is a cross section taken through a plane including line 10A-10A in FIG. 10.
Figure 11:
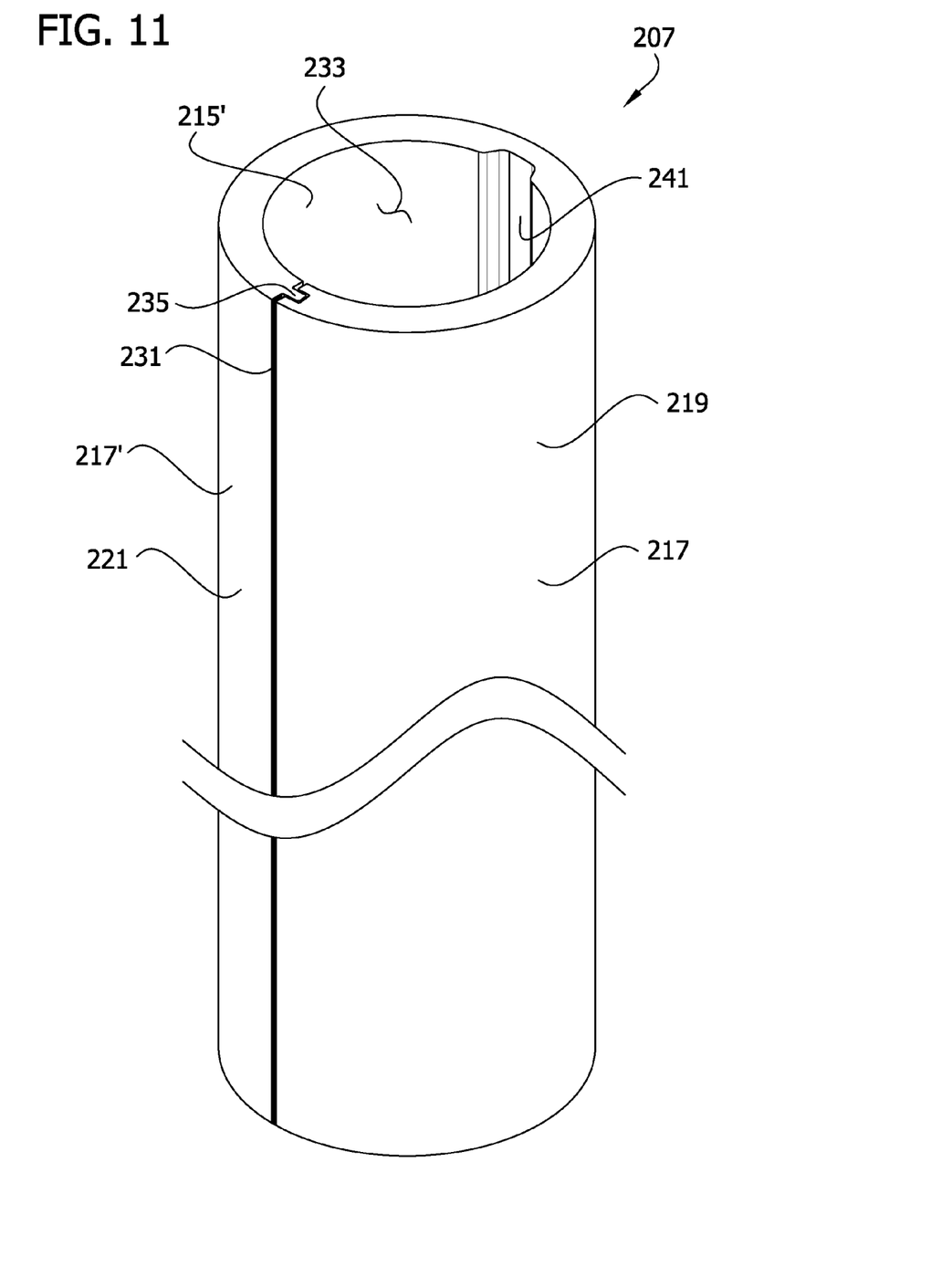
FIG. 11 is a fragmentary perspective of a third embodiment of a probe showing the probe shaft members attached by a living hinge and in a closed position.
Figure 12:
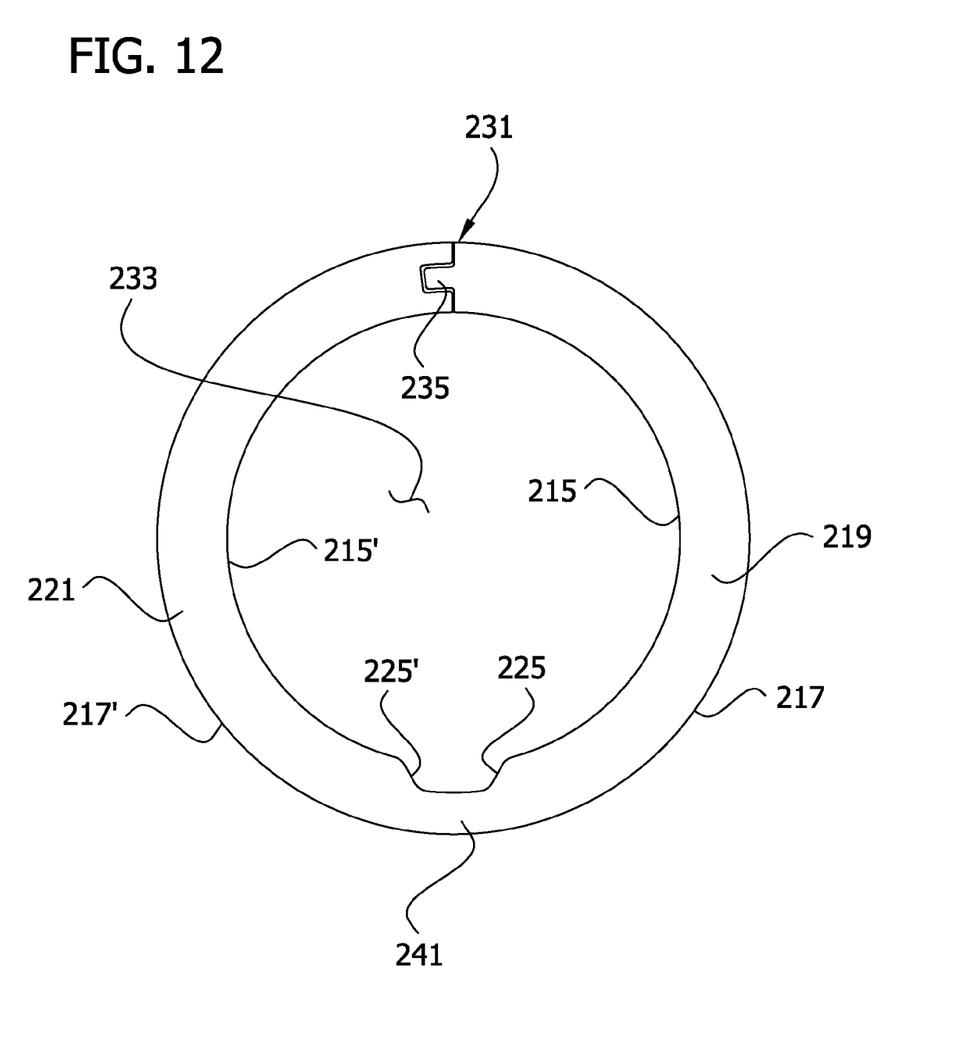
FIG. 12 is a top view of the probe in FIG. 11.

The interior surface 115, 115' of each probe shaft member 119, 121 include a planar contact surface 129, 129' that are also part of the laterally projecting portions (FIG. 10). Channels 133, 133' extend longitudinally in each of the probe shaft members 119, 121 and separate the contact surface 129, 129' into two separate sections. In the illustrated embodiment, the channels 133 are sized and shaped to receive a circuit as described in the first embodiment. For example, only one probe shaft member, 119, 121 may have a channel 133. Still other components and contours for positioning the circuit in the probe 107 can be used without departing from the scope of the present invention. One of the sections of each contact surface 129, 129' includes an elongate projection 147, 147'. The other section of the contact surface 129, 129' has an elongate recess 149, 149'. The projections 147, 147' are configured for receipt in the recesses 149', 149, respectively, forming joints to attach the first probe shaft member 119 to the second probe shaft member 121. The edges 125, 125', 127, 127' of the probe shaft member 119, 121 can also be welded or bonded together via weld/bond line 113 to secure the probe shaft members together.

Figure 8:
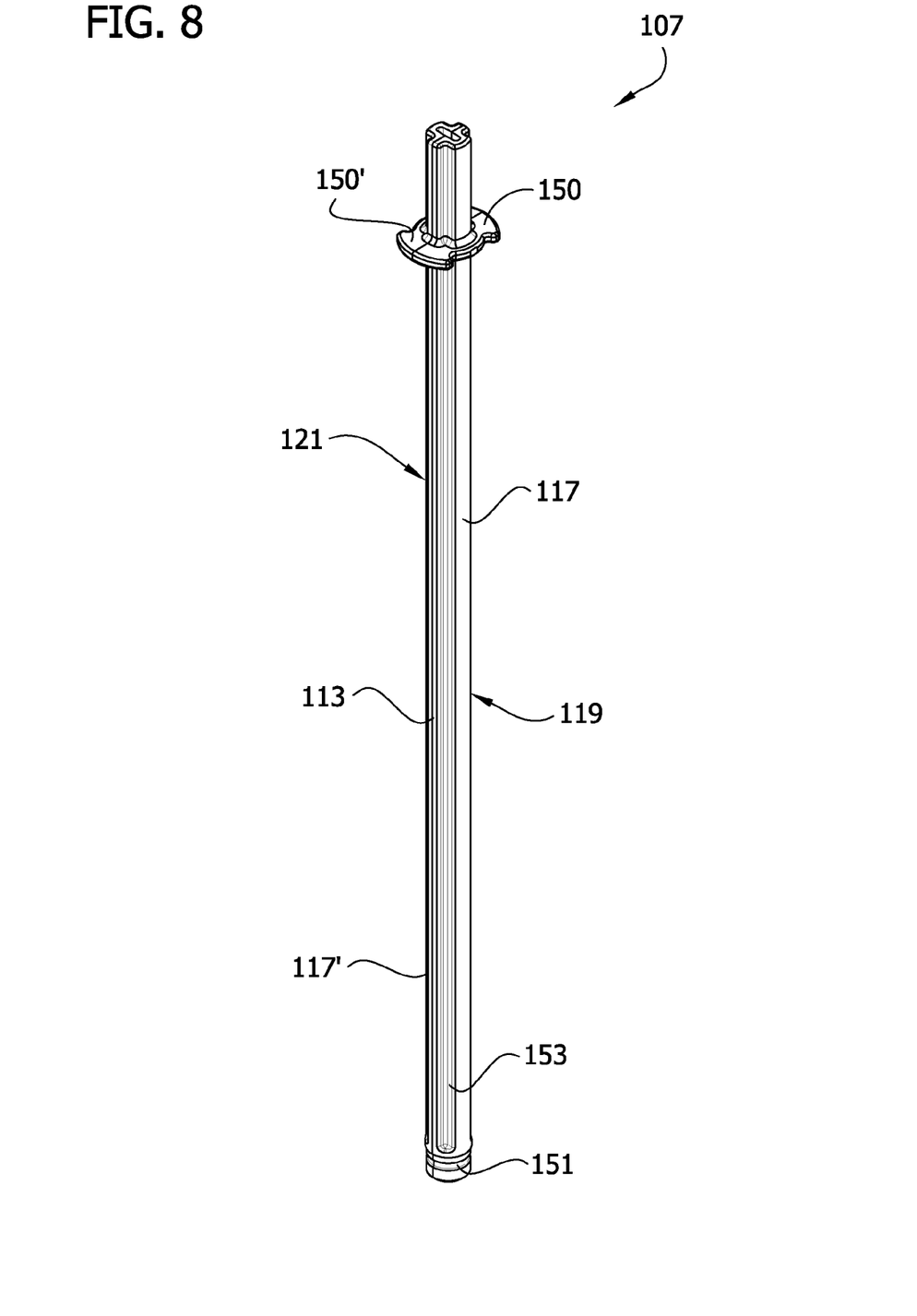
FIG. 8 is a perspective of a second embodiment of the probe.
Figure 9:
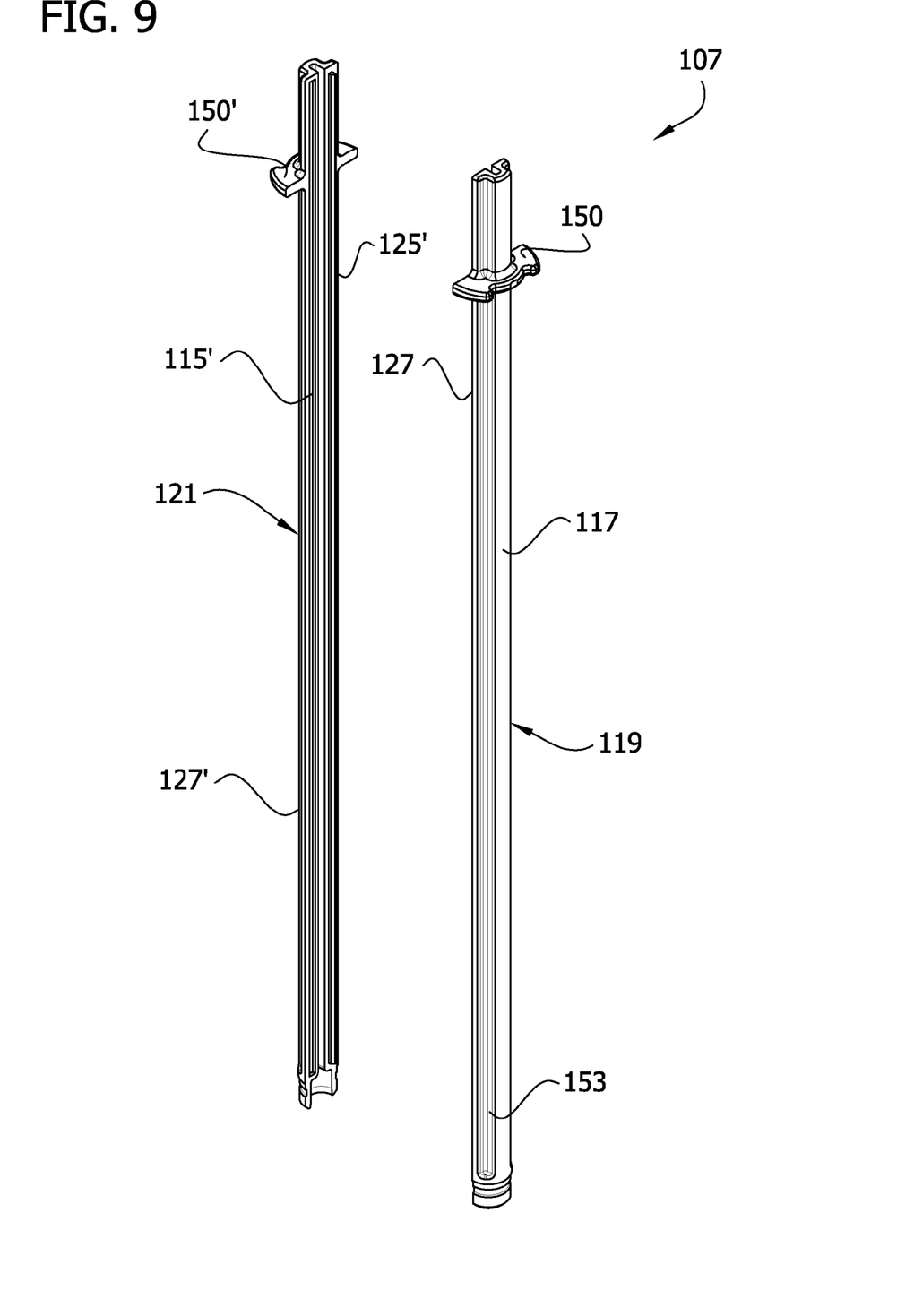
FIG. 9 is an exploded perspective of the probe of the second embodiment.

The exterior surface 117, 117' of each probe shaft member 119, 121 include a flange 150, 150' for attaching a conventional probe handle (not shown) to the probe shaft 119. An annular recess 151 at the distal end is configured to attach a probe tip (not shown) to the probe 107. A pair of channels 153 are disposed adjacent the first and second edges 125, 127 and 125', 127' of the probe shaft members 119, 121. The channels 153 are configured to engage an interior surface of a probe cover to retain the probe cover to the probe 107 and prevent rotation of the probe cover with respect to the probe. A single channel or 3 or more channels can be used without departing from the scope of the present invention. Additionally, the channels may have a cross sectional shape other than triangular. For instance, the cross sectional shape may be rectangular or circular.

Referring to FIGS. 11-14, a probe 207 of a third embodiment is shown. The probe 207 comprises a first, elongate semi-cylindrical probe shaft member 219 having a distal end, a proximal end, first and second edges 225, 227 extending between the proximal and distal ends, an interior surface 215 and an exterior surface 217. A second elongate, semi-cylindrical probe shaft member 221 includes a distal end, a proximal end, first and second edges 225', 227' extending between the proximal and distal ends, an interior surface 215' and an exterior surface 217'. The first and second probe shaft members 219, 221 are substantially identical. Therefore, their corresponding parts have been given the same number distinguished by a prime.

Figure 13:
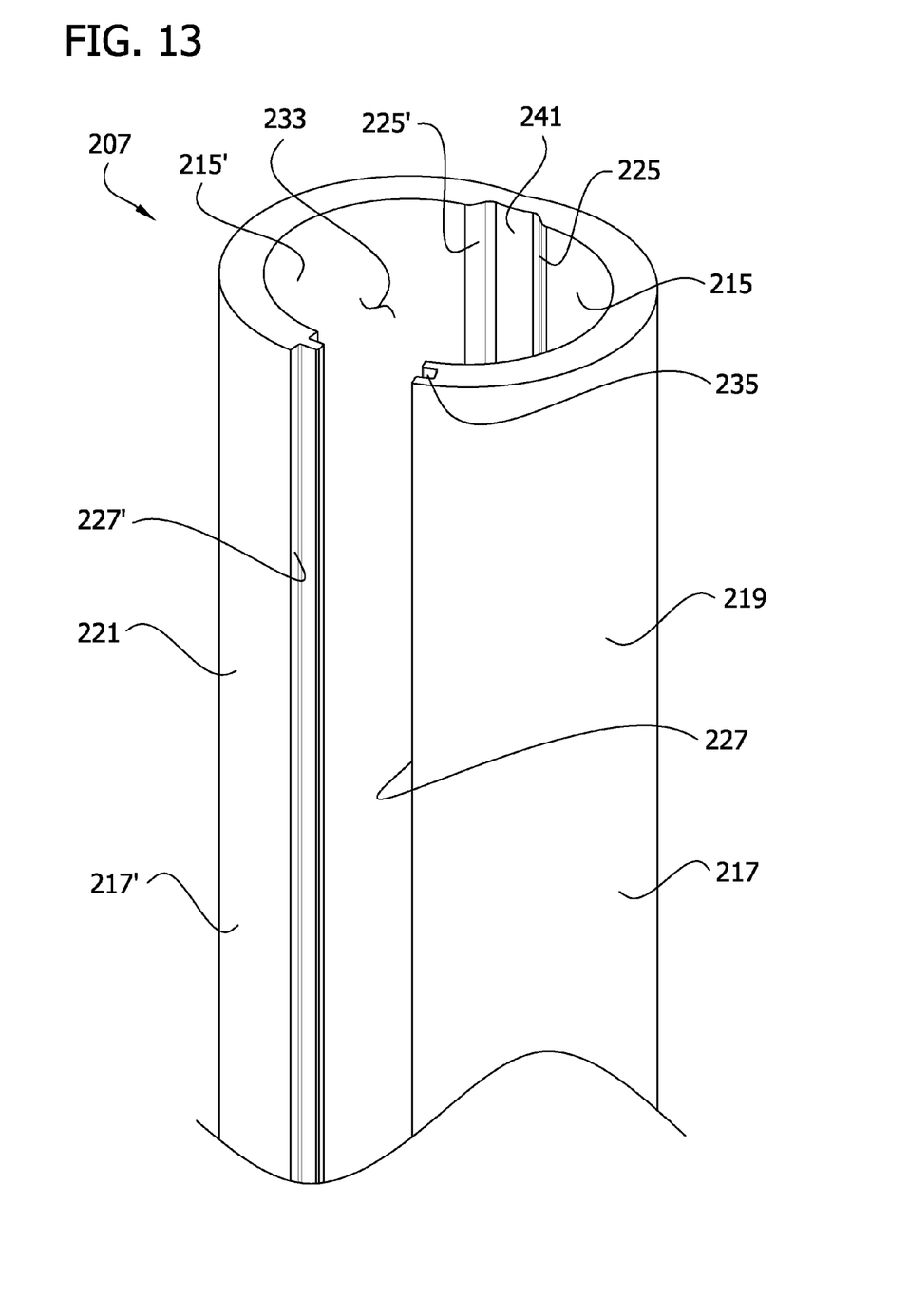
FIG. 13 is a perspective similar to FIG. 11 of the probe shown in an open position.
Figure 14:
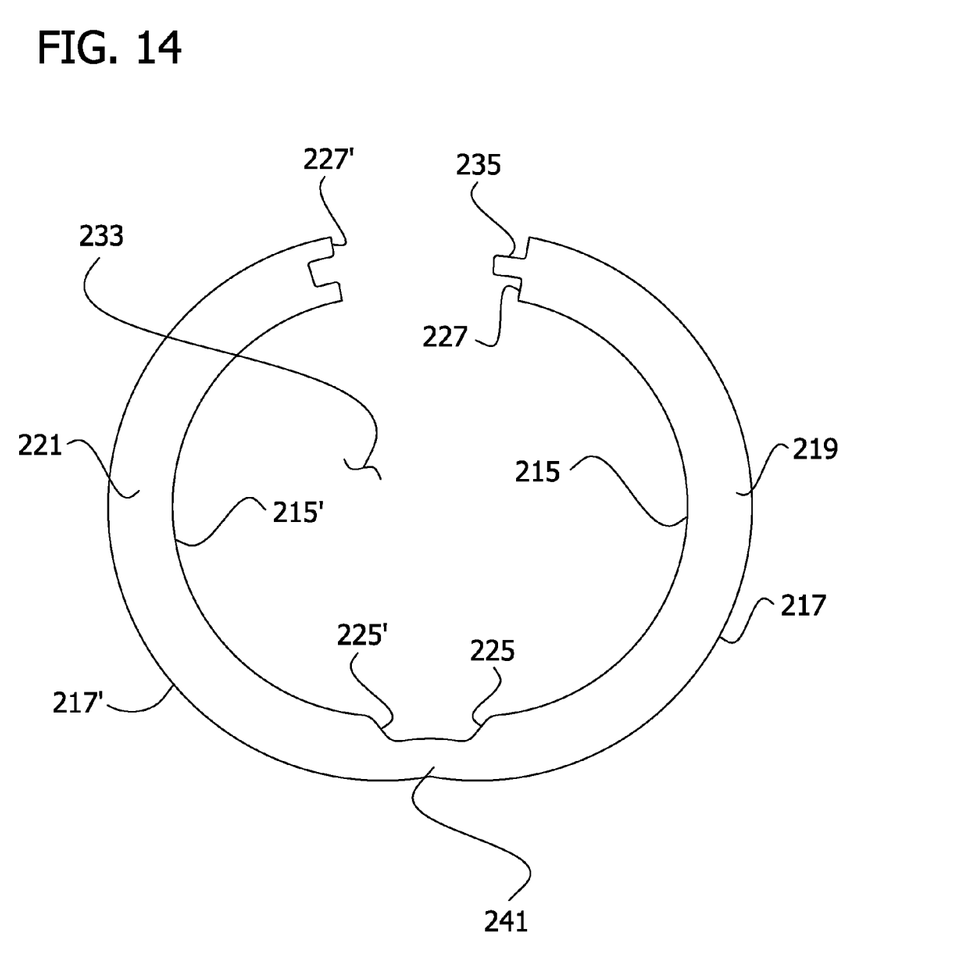
FIG. 14 is a top view of the probe in FIG. 13.

The second probe shaft member 221 is attached to the first probe shaft member 219 along a joint 231, forming an interior space 233 between the probe shaft members when the probe shaft members are in a closed position. The joint 231 may include a bond, an ultrasonic weld or any other suitable means for securing the probe shaft members 219, 221 together. In the illustrated embodiment, the second edge 227, 227' of each of the probe shaft members 219, 221 has a keyed interconnection 235 to promote alignment of the probe shaft members when they are secured together (FIGS. 13 and 14).

A living hinge 241 (broadly, a hinge) molded as one piece of material with the probe shaft members 219, 221 is incorporated to attach the probe shaft members. The hinge 241 attaches the probe shaft members 219, 221 along the first edge 225, 225' of each of the probe shaft member and the joint 231 attaches the probe shaft members along the second edge 227, 227' of each probe shaft member. It is envisioned that other structures can be used to attach the probe shaft members without departing from the scope of the present invention. To form the probe 207 having the living hinge 241, a single mold is used that integrates a thin plastic bridge between the probe shaft members 219, 221. Rather than bringing together two separated probe members as describe in the first embodiment, the probe shaft members 219, 221 are folded together at the hinge 241 and permanently attached along the opposite edges 227, 227' via the weld or bond line 231.

The "clam shell" probe shaft design allows the two probe shaft members to be closed together, around the internal probe circuitry. As result, the internal probe circuitry is easily inserted into the probe without the risk of damaging the circuitry. This provides an advantage over the prior art designs which require the circuitry to be pulled through the probe shaft because the shafts are molded into closed cylindrical structures.

It is understood that the features discussed in each embodiment are interchangeable where possible.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A probe for an electronic thermometer comprising:
   a first elongate, semi-cylindrical probe shaft member having an open distal end, an open proximal end, first and second edges extending between the proximal and distal ends, an interior surface and an exterior surface; and
   a second elongate, semi-cylindrical probe shaft member having an open distal end, an open proximal end, first and second edges extending between the proximal and distal ends, an interior surface and an exterior surface, the first and second probe shaft members being adapted for insertion into a patient;
   a joint along which the second probe shaft member is attached to the first probe shaft member forming an interior space between the probe shaft members;
   a probe tip mounted on the distal ends of the first and second probe shaft members; and
   a temperature sensor enclosed in the probe and in thermal communication with the probe tip.

2. A probe as set forth in claim 1 wherein the joint comprises at least one of a weld line and a bond line.

3. A probe as set forth in claim 2 wherein the at least one of a weld line and a bond line extends between the edges of the probe shaft members connecting one of the first edge of the first probe shaft member to the first edge of the second probe shaft member, and the second edge of the first probe shaft member to the second edge of the second probe shaft member.

4. A probe as set forth in claim 3 further comprising a hinge attaching the other of the first edge of the first probe shaft member to the first edge of the second probe shaft member, and the second edge of the first probe shaft member to the second edge of the second probe shaft member.

5. A probe as set forth in claim 4 wherein the hinge comprises a living hinge molded as one piece of material with the probe shaft members.

6. A probe as set forth in claim 1 further comprising a channel and a circuit received in the channel, the channel being formed in the interior surface of at least one of the first and second probe shaft members.

7. A probe as set forth in claim 1 further comprising a handle at the proximal end of each probe shaft member, the handle extending from the probe shaft members substantially perpendicular to a longitudinal axis of the probe shaft members.

8. A probe as set forth in claim 7 wherein the handle includes a cord restraint feature engaging the cord to retain the cord to the probe.

9. A probe as set forth in claim 8 wherein the cord restraint further comprises an annular projection in the handle adapted to engage a strain relief element of the cord.

10. A probe as set forth in claim 1 wherein the second edge of each probe shaft member has a mating keyed interconnection to promote alignment of the probe shaft members when the probe shaft members are attached to each other.

11. A probe as set forth in claim 1 wherein the interior surface of the first probe shaft member includes an elongate groove and the interior surface of the second probe shaft member includes a pair of spaced apart elongate protrusions configured to mate with the elongate groove in the interior surface of the first probe shaft member to align the probe shaft members for securement by the joint.

12. A probe as set forth in claim 11 further comprising a flex circuit received in a channel formed by the elongate protrusions.

13. A probe as set forth in claim 1 wherein the interior surface of each of the of the first and second probe shaft members includes a planar contact surface, and a channel extending longitudinally along the probe shaft member separating the contact surface of the probe shaft member into two separate sections, wherein one of the sections includes an elongate projection and the other of the sections includes an elongate recess, the elongate projection on the first probe shaft member being configured for receipt in the elongate recess in the second probe shaft member and the elongate projection on the second probe shaft member being configured for receipt in the elongate recess in the first probe shaft member forming the joint along which the second probe shaft member is attached to the first probe shaft member, wherein the elongate projections and the elongate recesses are disposed at a center of a respective one contact surface section.

14. A probe for an electronic thermometer comprising:
a substantially tubular shaft having a proximal end, a distal end, an inner surface and an outer surface, the tubular shaft being adapted for insertion into a patient;
a probe tip mounted on the distal end of the shaft and adapted to be heated to a temperature by an object for use in measuring the temperature of the object;
a temperature sensor enclosed in the probe and in thermal contact with the probe tip; and
at least one component molded on the outer surface of the shaft, the molded component being disposed inwardly from the proximal end of the shaft toward the distal end of the shaft and being configured to engage an interior surface of a probe cover receiving the probe at a location inwardly from an end of the probe cover, the shaft and the at least one component being molded together as one piece of material.

15. A probe as set forth in claim 14 wherein the at least one component comprises an annular recess extending continuously, circumferentially around the shaft to retain the probe cover on the probe.

16. A probe as set forth in claim 15 wherein the at least one component further comprises a rib projecting radially outward from the shaft for engaging an inner surface of the probe cover to block rotation of the probe cover with respect to the probe.

17. A probe as set forth in claim 14 wherein the at least one component comprises a rib projecting radially outward from the probe shaft for engaging an inner surface of the probe cover to block rotation of the probe cover with respect to the probe.

18. A probe as set forth in claim 14 further comprising first and second probe shaft members and a joint along which the first and second shaft members are attached to each other.

19. A probe as set forth in claim 18 wherein the joint comprises at least one of a weld line and a bond line.

20. A probe for an electronic thermometer comprising:
a substantially tubular shaft having a proximal end, a distal end, an inner surface and an outer surface, the outer surface defining an outer surface of the probe;
a probe tip disposed on the distal end of the shaft and adapted to be heated to a temperature by an object for use in measuring the temperature of the object;
a temperature sensor in thermal contact with the probe tip; and
at least one component molded on the outer surface of the shaft and configured to engage an interior surface of a probe cover receiving the probe, the at least one component comprising a longitudinal channel extending substantially along an entire length of the shaft to retain the probe cover to the probe and prevent rotation of the probe cover with respect to the probe, the shaft and the at least one component being molded together as one piece of material.

21. A probe as set forth in claim 20 wherein the longitudinal channel is one of rectangular and triangular in shape.

* * * * *